US012139592B2

(12) United States Patent
Hosoi et al.

(10) Patent No.: US 12,139,592 B2
(45) Date of Patent: Nov. 12, 2024

(54) RESIN COMPOSITION COMPRISING COATED METAL OXIDE PARTICLES, RESIN-ATTACHED METAL FOIL, METAL-CLAD LAMINATED SHEET, AND CAPACITOR ELEMENT

(71) Applicant: Mitsui Mining & Smelting Co., Ltd., Tokyo (JP)

(72) Inventors: Toshihiro Hosoi, Ageo (JP); Yoshihiro Yoneda, Ageo (JP); Tetsuro Sato, Ageo (JP); Hitohiko Ide, Shimonoseki (JP); Hiromi Matsuura, Shimonoseki (JP); Kouichi Kawaratani, Shimonoseki (JP)

(73) Assignee: Mitsui Mining & Smelting Co., Ltd. (JP)

( * ) Notice: Subject to any disclaimer, the term of this patent is extended or adjusted under 35 U.S.C. 154(b) by 0 days.

(21) Appl. No.: 18/025,831

(22) PCT Filed: Sep. 14, 2021

(86) PCT No.: PCT/JP2021/033756
§ 371 (c)(1),
(2) Date: Mar. 10, 2023

(87) PCT Pub. No.: WO2022/070889
PCT Pub. Date: Apr. 7, 2022

(65) Prior Publication Data
US 2023/0365784 A1 Nov. 16, 2023

(30) Foreign Application Priority Data

Sep. 29, 2020 (JP) .................................. 2020-164175
Dec. 16, 2020 (JP) .................................. 2020-208499

(51) Int. Cl.
*B32B 5/16* (2006.01)
*B32B 15/01* (2006.01)
(Continued)

(52) U.S. Cl.
CPC ................. *C08K 9/02* (2013.01); *B32B 15/01* (2013.01); *B32B 15/20* (2013.01); *C08K 3/22* (2013.01);
(Continued)

(58) Field of Classification Search
CPC .................. B32B 2264/1023; Y10T 428/2991
See application file for complete search history.

(56) References Cited

U.S. PATENT DOCUMENTS

2010/0166641 A1  7/2010  Abe et al.
2017/0110760 A1*  4/2017  Hatta .................... B60L 58/14

FOREIGN PATENT DOCUMENTS

EP      0415750 A1 *  3/1991
JP      2002367856 A    12/2002
(Continued)

OTHER PUBLICATIONS

International Search Report (English and Japanese) issued in PCT/JP2021/033756, mailed Nov. 16, 2021; ISA/JP (7 pages).

*Primary Examiner* — Hoa (Holly) Le
(74) *Attorney, Agent, or Firm* — Harness, Dickey & Pierce, P.L.C.

(57) ABSTRACT

A resin composition is provided including: coated particles, each including a core containing a metal oxide and a coating layer containing an aluminum hydrous oxide and provided on a surface of the core; and a resin. The metal oxide is represented by $M_xO_y$, where M represents at least one element selected from the group consisting of Ba, Ti, Sr, Pb, Zr, La, Ta, Ca, and Bi, and x and y each represent a number determined from a stoichiometric ratio according to the valence of the metal element M. The resin composition has an atomic ratio Al/(M+Al) of 0.05 or more and 0.7 or less, as determined by XPS for the particles contained in the resin composition.

16 Claims, 3 Drawing Sheets (51) Int. Cl.
  *B32B 15/20* (2006.01)
  *C08K 3/22* (2006.01)
  *C08K 3/30* (2006.01)
  *C08K 9/02* (2006.01)

(52) U.S. Cl.
  CPC ............ *C08K 3/30* (2013.01); *B32B 2250/02* (2013.01); *B32B 2264/1022* (2020.08); *B32B 2264/104* (2013.01); *B32B 2264/302* (2020.08); *B32B 2264/303* (2020.08); *B32B 2264/305* (2020.08); *B32B 2264/403* (2020.08); *B32B 2307/206* (2013.01); *B32B 2307/748* (2013.01); *B32B 2457/16* (2013.01); *C08K 2003/3045* (2013.01); *C08K 2201/005* (2013.01)

(56) References Cited

FOREIGN PATENT DOCUMENTS

| | | | |
|---|---|---|---|
| JP | 2007246351 | A | 9/2007 |
| JP | 2010150087 | A | 7/2010 |
| JP | 2015143297 | A | 8/2015 |
| JP | 2019178307 | A | 10/2019 |
| JP | 2020057667 | A | 4/2020 |
| WO | 2013187408 | A1 | 12/2013 |

* cited by examiner

Fig. 1(a)

Production Example 1

Production Example 10

RESIN COMPOSITION COMPRISING COATED METAL OXIDE PARTICLES, RESIN-ATTACHED METAL FOIL, METAL-CLAD LAMINATED SHEET, AND CAPACITOR ELEMENT

CROSS REFERENCE TO RELATED APPLICATIONS

This application is a U.S. National Phase Application under 35 U.S.C. 371 of International Application No. PCT/JP2021/033756, filed on Sep. 14, 2021, which claims priority to Japanese Patent Application No. 2020-164175, filed on Sep. 29, 2020, and Japanese Patent Application No. 2020-208499, filed Dec. 16, 2020. The entire disclosures of the above applications are expressly incorporated by reference herein.

BACKGROUND

Technical Field

The present invention relates to a resin composition. The present invention also relates to a resin-coated metal foil, a metal-clad laminate sheet, and a capacitor element that contain the resin composition.

Related Art

As capacitor elements are becoming smaller, dielectrics used in the capacitor elements are required to have a higher capacitance. In particular, capacitor elements incorporated in printed wiring boards are required to have a higher capacitance. In general, a capacitor element incorporated in a printed wiring board includes a resin layer containing dielectric particles and a binder.

One possible approach to increasing the capacitance of a capacitor element configured as described above is reducing the thickness of the resin layer, for example. However, a reduced thickness of the resin layer may disadvantageously results in a low breakdown voltage.

The high capacitance of the capacitor element may also be achieved by increasing the relative permittivity of the resin layer. The relative permittivity of the resin layer can be increased by simply increasing the packing ratio of the dielectric particles in the resin layer. However, increasing the packing ratio of the dielectric particles may disadvantageously results in the occurrence of an insulation failure caused by a leakage current.

In addition to the methods described above, JP 2002-367856A and JP 2020-57667A propose techniques in which the surfaces of dielectric particles are coated with an aluminum compound.

In the technique disclosed in JP 2002-367856A, the surfaces of dielectric particles are coated with aluminum oxide. However, aluminum oxide is likely to react with impurities (for example, moisture) when the surfaces of dielectric particles are coated with aluminum oxide, and it is therefore not easy to stably control the coated state of the particles that is suitable for achieving a high capacitance.

In the technique disclosed in JP 2020-57667A, the surfaces of dielectric particles are coated with an aluminum hydrous oxide. However, in JP 2020-57667A, aggregated particles of the hydrous oxide are generated, which may cause an increase in leakage current in the resin composition, as well as a reduction in the dispersibility of the particles in the resin and a reduction in the bondability of the resin.

Accordingly, it is an object of the present invention to provide an improvement of a resin composition that is suitable for use as a dielectric layer of a capacitor element, and more specifically, to provide a resin composition that can suppress leakage current and has a sufficient bondability.

SUMMARY

The present invention solves the problems described above by providing the following resin composition.

The resin composition includes: coated particles, each including a core containing a metal oxide and a coating layer containing an aluminum hydrous oxide and provided on a surface of the core; and a resin. The metal oxide is represented by $M_xO_y$, where M represents at least one element selected from the group consisting of Ba, Ti, Sr, Pb, Zr, La, Ta, Ca, and Bi, and x and y each represent a number determined from a stoichiometric ratio according to the valence of the metal element M. The resin composition has an atomic ratio Al/(M+Al) of 0.05 or more and 0.7 or less, as determined by XPS for the particles contained in the resin composition.

Also, the present invention provides a resin-coated metal foil including: a metal foil; and a layer made of the resin composition described above and provided on at least one side of the metal foil.

Furthermore, the present invention provides a metal-clad laminate sheet including: a first metal foil; a second metal foil; and a resin composition layer interposed between the two metal foils, wherein the resin composition layer is a cured product of the resin composition described above.

Furthermore, the present invention provides a capacitor element including: the metal-clad laminate sheet described above.

DETAILED DESCRIPTION

Hereinafter, the present invention will be described based on preferred embodiments thereof. The present invention relates to a resin composition. The resin composition contains specific particles and a resin, wherein the particles are dispersed in a matrix containing the resin. The particles and the resin will be described below.

The particles contained in the resin composition of the present invention are composite particles each including a core and a coating layer provided on a surface of the core. Hereinafter, the composite particles may also be referred to as "coated particles".

The core of each coated particle is a portion that accounts for most volume of the coated particle and is located at a central area of the coated particle. The core contains a metal oxide. As the metal oxide, a substance that has a high relative permittivity is preferably used. In view of a high relative permittivity of the metal oxide, the metal oxide is preferably represented by $M_xO_y$, where M represents at least one element selected from the group consisting of Ba, Ti, Sr, Pb, Zr, La, Ta, Ca, and Bi, and x and y each represent a number determined from a stoichiometric ratio according to the valence of the metal element M.

In the metal oxide represented by $M_xO_y$, M may represent only one metal element, or a combination of two or more metal elements. In the case where M represents only one metal element, examples of the metal oxide represented by $M_xO_y$ include BiO, SrO, Pb(II)O, $Pb(II)_2Pb(IV)O_4$, $Pb(IV)O_2$, $ZrO_2$, $La_2O_3$, $Ta_2O_5$, $TaO_2$, CaO, $Bi_2O_3$, and $TiO_2$.

On the other hand, in the case where M represents a combination of two or more metal elements in the metal oxide represented by $M_xO_y$, the metal element represented by M may be, for example, a combination of a divalent metal element and a tetravalent metal element. Specific examples include a combination of Ti and Ba, a combination of Ti and Sr, a combination of Ti and Ca, a combination of Ti and Mg, a combination of Ti and Bi, a combination of Zr and Ba, a combination of Zr and Sr, a combination of Zr and Ca, and a combination of Zr and Pb. By using any of these combinations of elements, it is possible to obtain a metal oxide that has a high relative permittivity.

Particularly preferably, the element M at least contains Ti and at least one of Ba and Sr, in view of further increasing the relative permittivity of the metal oxide.

It is also preferable that the metal oxide represented by $M_xO_y$ be a compound having a perovskite crystal structure, in view of increasing the relative permittivity of the metal oxide. In particular, it is preferable that the metal oxide represented by $M_xO_y$ be a compound that has a cubic or tetragonal perovskite crystal structure, in view of further increasing the relative permittivity of the metal oxide. From this viewpoint, the metal oxide is preferably a metal oxide represented by the compositional formula: $(M1)(M2)O_3$, where M1 and M2 represent elements selected from the elements represented by M.

Particularly preferred examples of the metal oxide represented by $M_xO_y$ in the present invention include $BaTiO_3$, $BaTi_4O_9$, $SrTiO_3$, $Pb(Zr,Ti)O_3$, $PbLaTiO_3$, $PbLaZrO$, and $SrBi_2Ta_2O_9$. $Pb(Zr,Ti)O_3$ means $Pb(Zr_zTi_{1-z})O_3$, where $0 \leq z \leq 1$, typically, $0 < z < 1$.

The metal oxide represented by $M_xO_y$ may contain a very small amount of a metal element other than the element M, for the purpose of further increasing the relative permittivity of the metal oxide. Examples of the metal element other than the element M include rare earth metal elements such as Y, Nd, Sm, and Dy.

The surface of the core containing the metal oxide represented by $M_xO_y$ is coated with a coating layer. The coating layer is a layer containing an aluminum hydrous oxide. The aluminum hydrous oxide encompasses so-called aluminum hydroxide, and is generally represented by the compositional formula: $Al_2O_3 \cdot nH_2O$, where n represents a positive number, and/or the compositional formula: $Al(OH)_3$. The coating layer directly coats the surface of the core, or indirectly coats the surface of the core via a layer other than the coating layer.

The inventors of the present application have conducted comprehensive studies using H-NMR, Al-NMR, AES, and XPS methods, and they consider that, among aluminum hydrous oxides, an aluminum hydrous oxide having the structure: $Al_2O_3 \cdot 3H_2O$ is particularly preferable in the present invention. Furthermore, the coordination structure of Al can be estimated by comparing a spectrum obtained by XAFS (X-ray absorption fine structure) analysis with a reference for aluminum compounds (for example, J. Synchrotron Rad. (1999) 6. 621-623). In consideration of these results, the inventors of the present application consider that an aluminum hydrous oxide having a structure of six-coordinate Al should be preferable. Examples of the structure of six-coordinate Al include Bayerite, Gibbsite, Doyleite, and Nordstrandite.

Herein, the term "coating layer" refers to a film-like portion that is present on the surface of the core. Accordingly, when an aluminum hydrous oxide is present in the form of aggregated particles, the hydrous oxide does not fall under the scope of the term "coating layer" even if the hydrous oxide is present on the surface of the core.

Whether or not a film-like portion containing an aluminum hydrous oxide is present on the surface of the core can be determined by observing each of the coated particles under a transmission electron microscope or performing elemental mapping analysis on the coated particles.

The coating layer may be present continuously over the entire area of the surface of the core or present discontinuously so as to partially expose the surface of the core, as long as the coating layer is present in the form of a film on the surface of the core such that the contour of the core can be clearly seen in elemental mapping for aluminum. It is desirable that the thickness of the coating layer should be uniform; however, the thickness of the coating layer may be non-uniform as long as the coating layer in the form of a film coats the surface of the core.

The coating layer has an average thickness of preferably 1 nm or more and 40 nm or less, more preferably 1 nm or more and 20 nm or less, and even more preferably 1 nm or more and 5 nm or less. The average thickness of the coating layer can be determined in the following manner: elemental mapping analysis is performed on the coated particles while the end portions of the particles, each having a coating layer, are raised (or in other words, in a direction perpendicular to the observation plane) using a transmission electron microscope (TEM); a plurality of points (for example, 10 points) are randomly selecting from the Al portion in the form of a film observed; the thickness is measured at each point; and the average of the found values of the thickness is calculated. In the elemental mapping analysis, cross-section processing may be performed on the coated particles using FIB (Focused Ion Beam) or the like as needed.

Figure 2A:
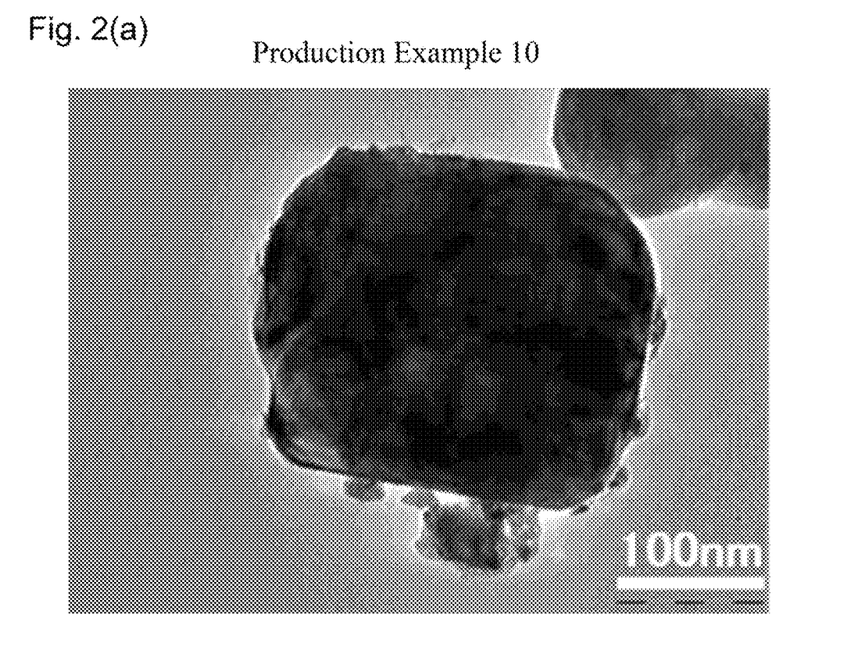
FIG. 2(a) is a transmission electron microscopy image of coated particles obtained in Production Example 10.
Figure 2B:
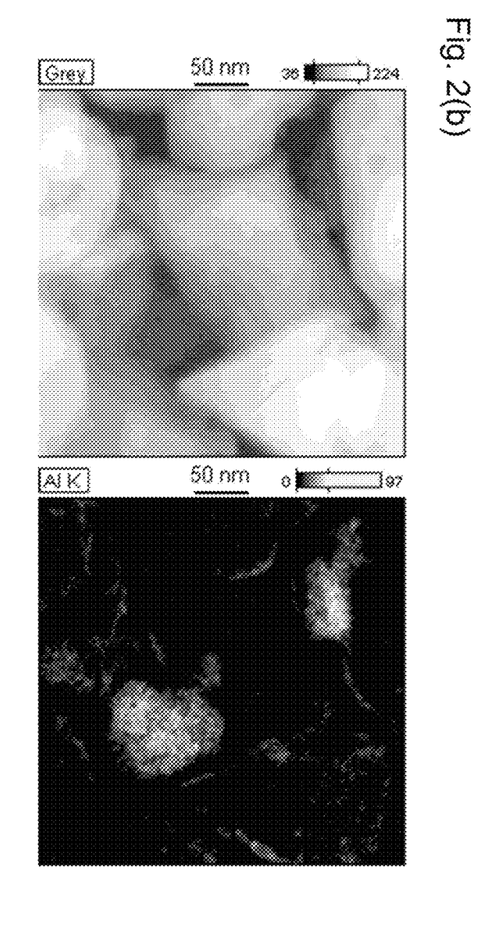
FIG. 2(b) shows, on the left side, a transmission electron microscopy image of the coated particles obtained in Production Example 10 after cross-section processing, and shows, on the right side, an elemental mapping image of the same field of view.

Due to the film-like portion (i.e., the coating layer) containing an aluminum hydrous oxide and covering the surface of the core, the leakage current can be suppressed to thereby increase the breakdown voltage advantageously, when the resin composition of the present invention is used to form, for example, a dielectric layer of a capacitor element. Also, due to such a coating layer, the dispersibility of the coated particles in the resin is advantageously improved. In contrast, in the case where an aluminum hydrous oxide in the form of aggregated particles is attached to the surface of the core (see FIG. 2), it is not easy to suppress the leakage current and improve the dispersibility of the particles in the resin, as is clear from Comparative Example 1, which will be described later.

In view of further suppressing the leakage current and further improving the dispersibility of the particles in the resin, it is preferable that the coating layer should directly coats the surface of the core. Whether or not the coating layer contains an aluminum hydrous oxide can be determined by analysis using H-NMR, Al-NMR, AES, XPS, and radiation XRD.

In view of further significantly suppressing the leakage current, it is preferable to control the amount of the coating layer containing an aluminum hydrous oxide on the core in the coated particles. By controlling the amount of the coating layer, the dispersibility of the coated particles in the resin is improved, and, as a result, the leakage current is further suppressed. Also, as a result of the improved dispersibility of the coated particles in the resin, a good adhesion between the resin composition of the present invention and an electrode can be advantageously obtained when the resin composition is used to form, for example, a dielectric layer of a capacitor element. The coated state of the core with the coating layer can be identified using various means. The inventors of the present application have found that, among others, XPS (X-ray photoelectron spectroscopy), which enables analysis of the elemental composition of the outermost surface of a substance, is suitable, and that the composition determined by XPS for the aluminum element and the element M present on the surface of the coated particle most accurately reflects the coated state of the core with the coating layer among the various means. Based on that finding, the inventors of the present application have further conducted studies, and have found that the dispersibility of the coated particles in the resin is improved significantly when the value of the atomic ratio Al/(M+Al) determined by XPS on the resin composition of the present invention falls within a specific numerical range. Specifically, the value of the atomic ratio Al/(M+Al) determined by XPS on the resin composition of the present invention (hereinafter, the value may also be referred to as "aluminum-covering ratio") is preferably 0.05 or more and 0.7 or less. When the value of the atomic ratio Al/(M+Al) is within the above-described range, the dispersibility of the coated particles in the resin is improved significantly while suppressing the leakage current.

The inventors of the present application consider that the aluminum-covering ratio within the above-described range corresponds to a state in which the coating layer thinly coats the surface of the core. When the degree of the cover with the coating layer on the core is excessively large, the leakage current is suppressed, but the dispersibility of the coated particles in the resin is likely to be low. On the other hand, when the degree of the cover with the coating layer on the core is insufficient, it is difficult to suppress the leakage current. From these viewpoints, the aluminum-covering ratio is more preferably 0.05 or more and 0.6 or less, and even more preferably 0.5 or less.

In the definition formula of the aluminum-covering ratio, Al/(M+Al), M represents the number of moles of the element M, and Al represents the number of moles of aluminum. In the case where the resin composition contains two or more elements as the element M, M represents the total number of moles of all elements M. The method for determining the aluminum-covering ratio by XPS will be described in Examples described later.

In relation to the aluminum-covering ratio, the proportion of the aluminum element is preferably 0.2 mass % or more and 3.0 mass % or less, more preferably 0.3 mass % or more and 2.5 mass % or less, and even more preferably 0.5 mass % or more and 2.0 mass % or less, based on the mass of all particles contained in the resin composition, in view of suppressing the leakage current and improving the dispersibility of the coated particles in the resin.

The proportion of the aluminum element based on the mass of all particles contained in the resin composition can be determined using ICP emission spectrometry.

It is also advantageous that the particle size of the coated particles, which each include a core and a coating layer covering the core, should be controlled, in view of suppressing the leakage current and improving the dispersibility of the coated particles in the resin. From this viewpoint, the coated particles contained in the resin composition have a 50th percentile particle size $D_{50}$ of preferably 0.01 μm or more and 3.0 μm or less, more preferably 0.05 μm or more and 1.0 μm or less, and even more preferably 0.1 μm or more and 0.5 μm or less, in a volume-weighted particle size distribution as determined by a laser diffraction/scattering method. In the case where the resin composition contains only the coated particles, the particle size $D_{50}$ means the particle size $D_{50}$ of the coated particles. In the case where the resin composition contains the coated particles and other particles, the particle size $D_{50}$ means the particle size $D_{50}$ that is determined by analyzing all particles. In order to produce, for example, the coated particles with a particle size $D_{50}$ within the above-described range the particle size of the core serving as the starting material of the coated particles may be adjusted, or the thickness of the coating layer formed on the surface of the core may be adjusted.

In relation to the particle size of the particles contained in the resin composition, the particles contained in the resin composition may have various types of shapes. For example, the particles of the resin composition may have a spherical shape, a polyhedral shape, a flat shape, a needle shape, a spindle-like shape, an amorphous shape, or the like. These shapes may be used in combination. The shape of the coated particles is dependent mainly on the shape of the core, and the shape of the core is generally reflected to the shape of the coated particles.

Various types of methods can be used to form the coating layer on the surfaces of cores to produce the coated particles. Exemplary methods will be described below.

Particles for cores as the starting material (hereinafter, the particles may also be referred to as "core particles") are dispersed in a dispersion medium such as water using a media mill such as a bead mill or a ball mill. In the case where an aluminum source compound to be used is an alkaline material, the pH of the dispersion obtained in the above-described manner is adjusted to be alkaline (for example, adjusted to a pH of 11 or more and 13 or less) with an alkaline substance. This is for the purpose of facilitating dissolution of the aluminum source compound to be added in a subsequent step in water. If the aluminum source compound is added at a pH lower than the above-described pH range, an aluminum hydrous oxide is generated, but the generated hydrous oxide is in the form of aggregated particles; thus a film-like portion is unlikely to be formed. The alkaline substance to be used may be, for example, an alkaline metal hydroxide such as sodium hydroxide or potassium hydroxide, or an alkaline earth metal hydroxide such as calcium hydroxide.

It is preferable to increase the temperature of the dispersion before the alkaline substance is added to the dispersion. The heating temperature is preferably 30° C. or more and 65° C. or less, more preferably 50° C. or more and 65° C. or less, and even more preferably 50° C. or more and 60° C.

or less. By setting a mild temperature condition within the above-described range, a film-like portion containing an aluminum hydrous oxide can be successfully formed in a step described later.

An alkaline aluminum source compound such as sodium aluminate is added to the resulting alkaline dispersion. It is preferable to gradually add the aluminum source compound in view of successfully forming the film-like portion containing an aluminum hydrous oxide. Next, an acidic substance is added to the resulting dispersion to decrease the pH of the dispersion to a level within a neutral range or a weak acidic range (for example, a pH of 4.5 or more and 7 or less). Through the above process, an aluminum hydrous oxide is generated on the surfaces of the core particles to obtain target coated particles. After that, aging is performed as needed, followed by washing and drying. As the acidic substance, any of various mineral acids can be used such as sulfuric acid or hydrochloric acid. This method will also be referred to as "the method A". It is preferable to continuously heat the dispersion within the above-described temperature range until the end of aging.

In the case where the aluminum source compound to be used is an acidic material such as aluminum nitrate, the pH of the dispersion is adjusted to be acidic (for example, adjusted to a pH of 2 or more and 4 or less) with an acidic substance. This is for the purpose of facilitating dissolution of the aluminum source compound to be added in a subsequent step in water. If the aluminum source compound is added at a pH lower than the above-described pH range, an aluminum hydrous oxide is generated, but the generated hydrous oxide is in the form of aggregated particles; thus a film-like portion is unlikely to be formed. The acidic substance may be, for example, hydrochloric acid or sulfuric acid.

It is preferable to increase the temperature of the dispersion before the acidic substance is added to the dispersion. The heating temperature is preferably 30° C. or more and 65° C. or less, more preferably 50° C. or more and 65° C. or less, and even more preferably 50° C. or more and 60° C. or less. By setting a mild temperature condition within the above-described range, a film-like portion containing an aluminum hydrous oxide can be successfully formed in a step described later.

An acidic aluminum source compound such as aluminum nitrate is added to the resulting acidic dispersion. It is preferable to gradually add the aluminum source compound in view of successfully forming the film-like portion containing an aluminum hydrous oxide. Next, an alkaline substance is added to the resulting dispersion to increase the pH of the dispersion to a level within a neutral range or a weak acidic range. Through the above process, an aluminum hydrous oxide is generated on the surfaces of the core particles to obtain target coated particles. After that, aging is performed as needed, followed by washing and drying. The alkaline substance may be, for example, an alkaline metal hydroxide such as sodium hydroxide or potassium hydroxide, or an alkaline earth metal hydroxide such as calcium hydroxide. This method may also be referred to as "the method B". It is preferable to continuously heat the dispersion within the above-described temperature range until the end of aging.

In the method A described above, the pH of the dispersion is temporarily increased to the alkaline side, and thereafter decreased to the acidic side to generate an aluminum-containing compound on the surfaces of the core particles. In the method B, the pH of the dispersion is temporarily decreased to the acidic side, and thereafter increased to the alkaline side to generate an aluminum-containing compound on the surfaces of the core particles. Instead of the methods A and B, the target coated particles can also be obtained by a method including simultaneously adding an aluminum source compound such as sodium aluminate or aluminum nitrate and an acidic substance such as hydrochloric acid or an alkaline substance such as sodium hydroxide to a dispersion containing core particles to generate an aluminum hydrous oxide on the surfaces of the core particles. This method may also be referred to as "the method C".

In the method C, the amount of the acidic substance or the alkaline substance added is preferably such that the pH of the resulting dispersion is within a neutral range or a weak acidic range. After that, aging is performed as needed, followed by washing and drying.

In the method C, it is preferable to gradually add the aluminum source compound and the acidic substance or the alkaline substance in view of successfully forming a film-like portion containing an aluminum hydrous oxide. If the aluminum source compound and the acidic substance or the alkaline substance are added all at once, an aluminum hydrous oxide is generated, but the generated hydrous oxide highly tends to be in the form of aggregated particles; thus a film-like portion is unlikely to be formed.

In the method C, the step of adding an alkaline substance may be performed between aging and washing to slightly increase the pH of the dispersion. The purpose of this step is to accelerate the settlement of a slurry and shorten the duration of the washing step. It is preferable to add the alkaline substance such that the pH of the resulting dispersion is within a range of 7 to 7.5.

In the method C, the step of dispersing the core particles in the dispersion medium may be performed without using a media mill. In other words, the core particles may be added to a dispersion medium, followed by lightly stirring, and then the aluminum source compound and an acidic substance may be added simultaneously to the dispersion.

In the method C as well, it is preferable to continuously heat the dispersion within the temperature range as described for the methods A and B until the end of aging.

The methods A, B, and C described above are wet methods. Instead of these wet methods, a dry method may also be used to produce coated particles. Hereinafter, the dry method may also be referred to as "the method D". In the method D, core particles with a particle size having been adjusted to a predetermined size are dry mixed with an alumina sol, specifically, a colloidal solution of an aluminum hydrous oxide using a mixer such as a shear mixer such that the alumina sol firmly attaches to the surfaces of the core particles. When dry mixing the core particles with the alumina sol, it is preferable to add a small amount of an organic solvent such as 2-propanol in view of successfully forming a coating layer. Regarding the conditions of the dry mixing, for example, the packing ratio of the container may be set to 70% or less in view of suppressing heat generation due to the mixing, and the humidity may be set to 50% RH or less in view of avoiding the influence of moisture to be absorbed.

Next, a resin used together with the coated particles, which have been described above, will be described. As the resin used in the present invention, an appropriate type of resin is used according to the specific application of the resin composition of the present invention. For example, a thermosetting resin and a thermoplastic resin can be used as the resin. It is preferable to use a thermosetting resin when the resin composition of the present invention is used to form a dielectric layer of a capacitor element. The term "thermosetting resin" encompasses a C-staged resin, which is a resin in a completely cured state, a B-staged resin, which is a resin in a semi-cured state prior to a completely cured state, and an uncured resin.

In the case where the resin contained in the resin composition of the present invention is a thermosetting resin, preferable examples of the thermosetting resin include a thermosetting resin used in the technical field of printed wiring boards. Such a thermosetting resin is preferably at least one selected from the group consisting of an epoxy resin, a polyphenylene ether resin, an aromatic polyamide resin, a polyamide imide resin, a polyimide resin, an active ester resin, a phenol resin, and a diamine compound, for example. These resins may be used singly or in a combination of two or more thereof.

In view of further increasing the dispersibility of the coated particles in the resin and increasing the bondability between the resin composition and a metal foil described later, it is preferable to use, as the resin, an epoxy resin, an aromatic polyamide resin, a polyimide resin, an active ester resin, a phenol resin, or a diamine compound.

The resin composition contains the above-described coated particles, and may optionally contain particles other than the coated particles. The contents of the resin and all particles contained in the resin composition may be set as appropriate according to the specific application of the resin composition. When the resin composition is used to form, for example, a dielectric layer of a capacitor element, the content of all particles in the resin composition is preferably 30 parts by mass or more and 90 parts by mass or less, more preferably 60 parts by mass or more and 85 parts by mass or less, and even more preferably 70 parts by mass or more, per 100 parts by mass of the solid content of the resin composition, in view of the balance between the improvement in the capacitance of the dielectric layer and the strength of the dielectric layer. The content of all particles contained in the resin composition can be determined by burning off the resin component in the resin composition and measuring the mass of the remaining particles.

The resin composition may further contain components for improving various characteristics of the resin composition, in addition to the above-described coated particles. An example of such a component is particles made of the metal oxide represented by $M_xO_y$ described above but without the coating layer (hereinafter, the particles may also be referred to as "non-coated particles"). When the resin composition contains the non-coated particles in addition to the coated particles, the advantageous effect of suppressing a reduction in the capacitance of the dielectric layer can be obtained.

In view of further significantly exhibiting the advantageous effect described above, the content of the non-coated particles is preferably 5 parts by mass or more and 50 parts by mass or less, more preferably 40 parts by mass or less, and even more preferably 30 parts by mass or less, per 100 parts by mass of a total of the coated particles and the non-coated particles.

The type of element M contained in the coated particles and the type of element M contained in the non-coated particles may be the same or different from each other. For example, the coated particles may be barium titanate particles each coated with a coating layer containing an aluminum hydrous oxide, and at the same time, the non-coated particles may be barium titanate particles without the coating layer.

Also, the coated particles and the non-coated particles may have the same shape and particle size, or different shapes and particle sizes.

The resin composition may further contain other particles, in addition to the metal oxide particles including the coated particles and the non-coated particles described above. An example of the other particles is barium sulfate particles. When the resin composition further contains barium sulfate particles, the rheology (flowability) of a coating solution to be prepared to form the resin composition into a thin film layer is advantageously improved to achieve ease of handling of the coating solution.

In view of further significantly exhibiting the advantageous effect described above, the content of the barium sulfate particles is preferably 0.16 parts by mass or more and 3.2 parts by mass or less, more preferably 0.24 parts by mass or more and 2.8 parts by mass or less, and even more preferably 0.32 parts by mass or more and 2.4 parts by mass or less, per 100 parts by mass of the solid content of the resin composition.

From the same viewpoint, the content of the barium sulfate particles is preferably 0.2 parts by mass or more and 4.0 parts by mass or less, more preferably 3.5 parts by mass or less, and even more preferably 3.0 parts by mass or less, per 100 parts by mass of the total amount of the coated particles, the non-coated particles, and the barium sulfate particles.

The average particle size of the barium sulfate particles is preferably 0.1 μm or more and 5 μm or less, more preferably 3 μm or less, and even more preferably 1.5 μm or less, as measured through observation under a scanning electron microscope. It is preferable to use barium sulfate particles with a particle size within the above-described range because the rheology (flowability) of the coating solution described above is further improved. There is no particular limitation on the shape of the barium sulfate particles, and the barium sulfate particles may have any of various shapes such as a spherical shape and a polyhedral shape. The average particle size can be calculated using image analysis software on an electron microscopy image obtained by observing, for example, 5 or more, preferably 10 or more particles under a scanning electron microscope.

In the case where the resin composition contains the coated particles and particles other than the coated particles (for example, the non-coated particles and/or the barium sulfate particles described above), the atomic ratio Al/(M+Al) described above is determined by XPS for all particles contained in the resin composition.

Specifically, the above-described atomic ratio can be determined by heating the resin composition in an oven at a high temperature (for example, in an atmosphere at a highest temperature of 500° C. for 60 minutes) to burn off the resin component and performing XPS, which will be described later, on the remaining powder. Whether the resin component has been burnt off can be checked by obtaining weight reduction data by TG-DTA.

The resin composition of the present invention may be used alone or in a combination of one or more other members according to the specific application of the resin composition. When the resin composition of the present invention is used to form, for example, a dielectric layer of a capacitor element, the resin composition is preferably used in the form of a film-like thin layer. In this case, in view of the balance between the improvement in the capacitance of the dielectric layer and the strength of the dielectric layer, the thickness of the thin layer after curing is preferably 15 μm or less, more preferably 8 μm or less, and even more preferably 4 μm or less. The thickness of the thin layer is preferably 0.2 μm or more, and more preferably 0.5 μm or more.

In order to form the resin composition of the present invention into a film-like thin layer, for example, a coating solution is prepared by mixing coated particles, a resin, and an organic solvent that can dissolve the resin, the coating solution is applied to a target object (for example, a metal foil, which will be described later) so as to form a coating film, and the coating film is dried. In the case where the resin is a thermosetting resin, the coating film obtained by drying is in an uncured state. By heating the coating film to a predetermined temperature, the coating film can be changed into a B-staged coating film, or in other words, a semi-cured coating film. By further heating the B-staged coating film, the B-staged coating film can be changed into a C-staged coating film, or in other words, a completely cured coating film.

One mode of using the resin composition of the present invention in combination with one or more other members may be a resin-coated metal foil obtained by providing a layer made of the resin composition (hereinafter also referred to as a "resin composition layer") on at least one side of a metal foil. When the resin contained in the resin composition layer is a thermosetting resin, the thermosetting resin in the resin-coated metal foil is preferably in a B-staged state, which is prior to a completely cured state. In this way, a practically preferable adhesion between the metal foil and the resin composition layer can be ensured.

The thickness of the resin composition layer in the resin-coated metal foil is preferably the same as the thickness described for the film-like thin layer mentioned above.

The resin composition layer may be provided on at least one side of the metal foil, or may be provided on each side of the metal foil depending on the application of the resin-coated metal foil.

The metal foil used may be a foil made of any of various types of metals. Examples include a copper foil, an aluminum foil, a stainless steel foil, a nickel foil, a titanium foil, and a stack of any of these foils. In particular, it is preferable to use a copper foil in view of economy and availability. The metal foil may be any of a rolled foil, an electrolytic foil, and a vapor deposition foil.

The thickness of the metal foil is not particularly limited, and can be set according to the specific application of the resin-coated metal foil. However, the thickness of the metal foil is preferably 0.1 µm or more and 100 µm or less, more preferably 0.5 µm or more and 70 µm or less, even more preferably 2 µm or more and 70 µm or less, yet even more preferably 10 µm or more and 70 µm or less, and most preferably 10 µm or more and 35 µm or less. When a metal foil has a thickness within the above-described range, it is possible to use an ordinary pattern forming method for forming wiring of a printed wiring board such as an MSAP (modified semi additive process), a SAP (semi additive process), or a subtractive process. For example, in the case of a metal foil with a thickness of, for example, 10 µm or less, the resin-coated metal foil of the present invention may be obtained by forming the resin composition layer on the side of a metal foil of a carrier-attached metal foil including a release layer and a carrier for improving ease of handling.

In view of ensuring a sufficient thickness to obtain a sufficiently high capacitance of the resin composition layer, the side of the metal foil that faces the resin composition layer preferably has a low roughness. From this viewpoint, the surface roughness of the side of the metal foil that faces the resin composition layer, specifically, the ten-point mean roughness Rzjis thereof as measured in accordance with JIS B0601-2001, is preferably 2.0 µm or less, more preferably 1.5 µm or less, even more preferably 1.0 µm or less, and yet even more preferably 0.5 µm or less. When the surface roughness is within the above-described range, the resin composition layer with a thin and uniform thickness can be easily formed. There is no particular limitation on the lower limit of the ten-point mean roughness Rzjis of the side of the metal foil that faces the resin composition layer; however, in view of improving the adhesion between the metal foil and the resin composition layer, Rzjis is preferably 0.005 µm or more, more preferably 0.01 µm or more, and even more preferably 0.05 µm or more.

The side of the metal foil that faces the resin composition layer preferably has a maximum peak height Sp of 0.05 µm or more and 3.3 µm or less, more preferably 0.06 µm or more and 3.1 µm or less, even more preferably 3.0 µm or less, and yet even more preferably 0.07 µm or more and 2.9 µm or less, as measured in accordance with ISO 25178. By controlling the surface profile of the metal foil as described above, a resin-coated metal foil can be obtained that can exhibit excellent properties in terms of withstand voltage and peel strength while ensuring a high capacitance.

From the same viewpoint, the side of the metal foil that faces the resin composition layer preferably has a root mean square of the gradient, Sdq, of 0.01 or more and 2.3 or less, more preferably 0.02 or more and 2.2 or less, even more preferably 0.03 or more and 2.0 or less, and yet even more preferably 0.04 or more and 1.8 or less, as measured in accordance with ISO 25178.

Furthermore, from the same viewpoint, the side of the metal foil that faces the resin composition layer preferably has a kurtosis Sku of 2.6 or more and 4.0 or less, more preferably 2.7 or more and 3.8 or less, and even more preferably 2.7 or more and 3.7 or less, as measured in accordance with ISO 25178.

Another mode of using the resin composition of the present invention in combination with one or more other members may be a metal-clad laminate sheet including a first metal foil, a second metal foil, and a resin composition layer interposed between the two metal foils. When the resin contained in the resin composition layer of the metal-clad laminate sheet is a thermosetting resin, the thermosetting resin is preferably a cured product. In this way, a practically preferable adhesion between the first metal foil and the second metal foil can be ensured, and in addition, the adhesion at the bonding interface between the resin composition layers and the adhesion at the bonding interface between the resin composition layer and the metal foil are improved to exhibit the advantageous effect of excellent fabricability in production of the metal-clad laminate sheet.

The type of the first metal foil and that of the second metal foil included in the metal-clad laminate sheet may be the same or different from each other. The type of metal foil may be the same as those described for the resin-coated metal foil mentioned above.

The first metal foil and the second metal foil included in the metal-clad laminate sheet may have the same thickness or different thicknesses. The thickness of the metal foil may be the same as that described for the resin-coated metal foil mentioned above.

In view of ensuring a sufficient thickness and a sufficiently high capacitance of the resin composition layer, the side of the first foil and that of the second metal foil that face the resin composition layer each preferably have a low roughness. From this viewpoint, the surface roughness of the side of the first foil that faces the resin composition layer and that of the second metal foil, specifically, the ten-point mean roughnesses Rzjis thereof as measured in accordance with JIS B0601-2001, are each preferably 2.0 µm or less, more preferably 1.5 μm or less, even more preferably 1.0 μm or less, and yet even more preferably 0.5 μm or less. When the surface roughness is within the above-described range, the resin composition layer with a thin and uniform thickness can be easily formed.

The side of at least one of the first metal foil and the second metal foil that faces the resin composition layer preferably has a maximum peak height Sp of 0.05 μm or more and 3.3 μm or less, more preferably 0.06 μm or more and 3.1 μm or less, even more preferably 3.0 μm or less, and yet even more preferably 0.07 μm or more and 2.9 μm or less, as measured in accordance with ISO 25178. By controlling the surface profile of the metal foils as described above, a metal-clad laminate sheet can be obtained that can exhibit excellent properties in terms of withstand voltage and peel strength while ensuring a high capacitance.

From the same viewpoint, the side of at least one of the first metal foil and the second metal foil that faces the resin composition layer preferably has a root mean square of the gradient, Sdq, of preferably 0.01 or more and 2.3 or less, more preferably 0.02 or more and 2.2 or less, even more preferably 0.03 or more and 2.0 or less, and yet even more preferably 0.04 or more and 1.8 or less, as measured in accordance with ISO 25178.

Furthermore, from the same viewpoint, the side of at least one of the first metal foil and the second metal foil that faces the resin composition layer preferably has a kurtosis Sku of 2.6 or more and 4.0 or less, more preferably 2.7 or more and 3.8 or less, and even more preferably 2.7 or more and 3.7 or less, as measured in accordance with ISO 25178.

The metal-clad laminate sheet has a structure in which the resin composition layer serving as a dielectric layer is provided between the first metal foil and the second metal foil, and thus the metal-clad laminate sheet can be used as a capacitor element. In the metal-clad laminate sheet, the resin contains the above-described coated particles, and accordingly, when the metal-clad laminate sheet is used as a capacitor element, the capacitor element can show a reduced leakage current and have an increased withstand voltage and also an increased capacitance.

To be more specific, the metal-clad laminate sheet preferably exhibits a leakage current as low as 150 μA/cm$^2$ or less, more preferably 150 μA/cm$^2$ or less, and even more preferably 50 μA/cm$^2$ or less, as measured by applying a DC voltage of 50 V between the first metal foil and the second metal foil of the metal-clad laminate sheet.

Also, the metal-clad laminate sheet preferably exhibits a withstand voltage per unit thickness of the resin composition layer as high as 50 V/μm or more, more preferably 75 V/μm or more, and even more preferably 100 V/μm or more, as measured by applying a DC voltage between the first metal foil and the second metal foil of the metal-clad laminate sheet. As used herein, the term "unit thickness" means a thickness of 1 μm of the resin composition layer.

Also, the metal-clad laminate sheet preferably has a capacitance per unit area at a frequency of 1 kHz as high as 10 nF/in$^2$ or more, more preferably 20 nF/in$^2$ or more, and even more preferably 30 nF/in$^2$ or more. As used herein, the term "unit area" means in$^2$ (square inch).

Furthermore, the metal-clad laminate sheet preferably has a peel strength as high as 0.3 kN/m or more, more preferably 0.4 kN/m or more, and even more preferably 0.5 kN/m or more, between the resin composition layer and the first metal foil and/or the second metal foil.

The metal-clad laminate sheet is preferably produced by preparing a set of resin-coated metal foils described above, superimposing the resin-coated metal foils such that the resin composition layers (the resin composition layers are preferably B-staged) of the resin-coated metal foils face each other, and pressing the superimposed resin-coated metal foils under heat to completely cure the resin composition layers.

The resin-coated metal foil and the metal-clad laminate sheet including a layer of the resin composition of the present invention are preferably used as the material for a printed wiring board including a dielectric layer.

The present invention has been described above based on preferred embodiments thereof, but the present invention is not limited to the embodiments. For example, in each of the first metal foil and the second metal foil of the metal-clad laminate sheet described above, a carrier foil may be provided on the side that does not face the resin composition layer via a release layer.

Also, in the metal foil of the resin-coated metal foil described above, a carrier foil may be provided on the side that does not face the resin composition layer via a release layer.

EXAMPLES

Hereinafter, the present invention will be described in further detail by way of examples given. However, the scope of the present invention is not limited to the examples. Unless otherwise stated, the percent sign "%" and the term "parts" used mean "mass %" and "parts by mass", respectively.

Production Example 1

A dispersion was obtained by mixing 80 kg of spherical barium titanate particles with a particle size $D_{50}$ of 0.1 μm and a perovskite crystal structure with 700 kg of water, and dispersing the barium titanate particles in the water using a bead mill.

The obtained dispersion was heated to 60° C. An aqueous sodium hydroxide solution was added to the dispersion until the pH of the dispersion reached about 12. Next, 3050 g of an aqueous sodium aluminate solution was gradually added to the dispersion.

Next, an aqueous sulfuric acid solution was added to the dispersion to decrease the pH of the dispersion to about 5 to thereby form a coating layer of aluminum hydrous oxide on the surfaces of the barium titanate particles.

Aging was performed for 30 minutes, and thereafter, the particles were washed with water until the electrical conductivity of the aqueous phase reached 100 μS/cm or less. After that, the particles were dried at 150° C. to obtain target coated particles. Also, as a by-product, barium sulfate particles were obtained that had an average particle size of 0.8 μm as measured through observation under a scanning electron microscope. The obtained coated particles were analyzed by H-NMR, Al-NMR, AES, and XPS, and evaluation results thereof were combined to check whether an aluminum hydrous oxide was generated (the same applies to production examples given below).

Production Example 2

A dispersion was obtained by mixing 700 g of spherical barium titanate particles with a particle size $D_{50}$ of 0.1 μm and a perovskite crystal structure with 7000 g of water, and dispersing the barium titanate particles in the water using a bead mill.

The obtained dispersion was heated to 60° C. An aqueous hydrochloric acid solution and an aqueous sodium aluminate solution were simultaneously and gradually added to the dispersion to decrease the pH of the dispersion to about 5 to thereby form a coating layer of aluminum hydrous oxide on the surfaces of the barium titanate particles. The amount of the sodium aluminate added was 27 g.

Aging was performed for 30 minutes, and thereafter, the particles were washed with water until the electrical conductivity of the aqueous phase reached 100 µS/cm or less. After that, the particles were dried at 150° C. to obtain target coated particles.

Production Example 3

A dispersion was obtained by mixing 700 g of spherical barium titanate particles with a particle size $D_{50}$ of 0.1 µm with 7000 g of water, and dispersing the barium titanate particles in the water using a bead mill.

The obtained dispersion was heated to 60° C. An aqueous hydrochloric acid solution and an aqueous sodium aluminate solution were simultaneously and gradually added to the dispersion to decrease the pH of the dispersion to about 5 to thereby form a coating layer of aluminum hydrous oxide on the surfaces of the barium titanate particles. The amount of the sodium aluminate added was 27 g.

Aging was performed for 30 minutes, and thereafter, an aqueous sodium hydroxide solution was added to the dispersion to increase the pH of the dispersion to about 7. Next, the particles were washed with water until the electrical conductivity of the aqueous phase reached 100 µS/cm or less. After that, the particles were dried at 150° C. to obtain target coated particles.

Production Example 4

A dispersion was obtained by mixing 700 g of spherical barium titanate particles with a particle size $D_{50}$ of 0.1 µm with 7000 g of water. Then, target coated particles were obtained in the same manner as in Production Example 2, except that dispersing the barium titanate particles using a bead mill was not performed.

Production Example 5

A dispersion was obtained by mixing 700 g of spherical barium titanate particles with a particle size $D_{50}$ of 0.1 µm with 7000 g of water, and wet crushing and dispersing the barium titanate particles in the water using a bead mill.

Then, target coated particles were obtained in the same manner as in Production Example 2, except that the amount of the sodium aluminate added was changed to 19 g.

Production Example 6

A dispersion was obtained by mixing 700 g of spherical barium titanate particles with a particle size $Ds_{50}$ of 0.1 µm with 7000 g of water, and dispersing the barium titanate particles in the water using a bead mill.

Then, target coated particles were obtained in the same manner as in Production Example 2, except that the amount of the sodium aluminate added was changed to 68 g.

Production Example 7

A dispersion was obtained by mixing 700 g of spherical barium titanate particles with a particle size $D_{50}$ of 0.1 µm with 7000 g of water, and dispersing the barium titanate particles in the water using a bead mill.

The obtained dispersion was heated to 60° C. An aqueous sodium hydroxide solution was added to the dispersion to bring the pH of the dispersion to about 12. Next, an aqueous sodium aluminate solution was gradually added to the dispersion. The amount of the sodium aluminate added was 27 g.

Next, an aqueous hydrochloric acid solution was added to the dispersion to decrease the pH of the dispersion to about 5 to thereby form a coating layer of aluminum hydrous oxide on the surfaces of the barium titanate particles.

Aging was performed for 30 minutes, and thereafter, the particles were washed with water until the electrical conductivity of the aqueous phase reached 100 µS/cm or less. After that, the particles were dried at 150° C. to obtain target coated particles.

Production Example 8

A dispersion was obtained by mixing 200 g of spherical barium titanate particles with a particle size $D_{50}$ of 0.1 µm with 2000 g of water, and dispersing the barium titanate particles in the water using a bead mill.

The obtained dispersion was heated to 60° C. An aqueous sodium hydroxide solution and an aqueous aluminum nitrate solution were simultaneously and gradually added to the dispersion to bring the pH of the dispersion to about 5 to thereby form a coating layer of aluminum hydrous oxide on the surfaces of the barium titanate particles. The amount of the aluminum nitrate added was 30 g.

Aging was performed for 30 minutes, and thereafter, the particles were washed with water until the electrical conductivity of the aqueous phase reached 100 µS/cm or less. After that, the particles were dried at 150° C. to obtain target coated particles.

Production Example 9

In this production example, coated particles were produced using a dry method. Spherical particles with a particle size $D_{50}$ of 0.15 µm were obtained by crushing 100 g of barium titanate particles using a mixer (Force Mill, available from Osaka Chemical Co., Ltd.).

The crushed barium titanate particles were mixed with an alumina sol (Alumina Sol-10A, available from Kawaken Fine Chemicals Co., Ltd.) and 2-propanol at a packing ratio of 40% and a humidity of 40% RH using a mixer (Force Mill available from Osaka Chemical Co., Ltd.) to thereby form a coating layer of aluminum hydrous oxide on the surfaces of the barium titanate particles. The amount of the alumina sol used was 20 g. The amount of the 2-propanol used was 2 g.

After that, the particles were dried at 110° C. to obtain target coated particles.

Production Example 10

This production example corresponds to an example disclosed in JP 2020-57667A.

A dispersion was obtained by mixing 700 g of spherical barium titanate particles with a perovskite crystal structure with 7000 g of water, and dispersing the barium titanate particles in the water using a bead mill.

The obtained dispersion was heated to 70° C. The pH of the dispersion measured at this time was about 9. An aqueous sodium aluminate solution was added to the dispersion. The amount of the aqueous sodium aluminate solution added was 106 g. At this time, deposition of an aluminum-containing water-insoluble compound was observed. The pH of the dispersion measured at this time was about 10. Next, an aqueous sodium hydroxide solution was added to the dispersion to bring the pH of the dispersion to about 11.

Next, an aqueous hydrochloric acid solution was added to the dispersion to decrease the pH of the dispersion to about 7 to thereby form a coating layer of aluminum hydrous oxide on the surfaces of the barium titanate particles.

Aging was performed for 30 minutes, and thereafter, the particles were washed with water until the electrical conductivity of the aqueous phase reached 100 μS/cm or less. After that, the particles were dried at 150° C. to obtain target coated particles.

Production Example 11

This production example corresponds to an example in which the amount of the coating layer attached was increased significantly as compared with that of Production Example 1.

A dispersion was obtained by mixing 700 g of spherical barium titanate particles with a perovskite crystal structure with 7000 g of water, and dispersing the barium titanate particles in the water using a bead mill.

The obtained dispersion was heated to 60° C. An aqueous sodium hydroxide solution was added to the dispersion to bring the pH of the dispersion to about 12. Next, an aqueous sodium aluminate solution was added to the dispersion. The amount of the sodium aluminate added was 106 g.

Next, an aqueous hydrochloric acid solution was added to the dispersion to decrease the pH of the dispersion to about 7 to thereby form a coating layer of aluminum hydrous oxide on the surfaces of the barium titanate particles.

Aging was performed for 30 minutes, and thereafter, the particles were washed with water until the electrical conductivity of the aqueous phase reached 100 μS/cm or less. After that, the particles were dried at 150° C. to obtain target coated particles.

Production Example 12

Target coated particles were obtained in the same manner as in Production Example 7, except that spherical barium titanate particles with a particle size $D_{50}$ of 0.2 μm were used.

Production Example 13

Target coated particles were obtained in the same manner as in Production Example 12, except that the amount of the sodium aluminate added was changed to 20 g.

Production Example 14

Target coated particles were obtained in the same manner as in Production Example 12, except that the amount of the sodium aluminate added was changed to 13 g.

Production Example 15

Target coated particles were obtained in the same manner as in Production Example 12, except that the amount of the sodium aluminate added was changed to 7 g.

Examples 1 to 13 and Comparative Examples 1 and 2

The coated particles obtained in any one of Production Examples 1 to 15 (also with barium titanate particles for Production Example 1) and a dispersant were mixed with cyclopentanone as a solvent using a disperser to obtain a slurry.

After formation of the slurry had been confirmed, a coating solution was prepared by kneading the slurry with a varnish consisting of the resin component of Formulation Example 1 shown in Table 1 given below. The mass ratios of the coated particles, other particles, and the resin component in the coating solution were as shown in Table 2.

The resulting coating solution was applied to a copper foil (available from Mitsui Mining & Smelting Co., Ltd.; thickness 18 μm and surface roughness Rzjis 0.5 μm) using a bar coater such that the resin composition layer after drying would have a thickness of about 1.5 μm. After that, the copper foil coated with the resin composition was dried for 3 minutes in an oven at 160° C. to semi-cure the resin composition, to thereby obtain a resin-coated copper foil.

Two resin-coated copper foils were stacked such that the resin sides of the resin-coated copper foils faced each other, and the stacked resin-coated metal foils were subjected to vacuum pressing for 90 minutes at a pressure of 40 kgf/cm² and a temperature of 200° C. to cure the resin composition, to thereby obtain a copper-clad laminate sheet including the thus-cured resin composition as a dielectric layer. The thickness of the resin composition layer of the copper-clad laminate sheet was measured, and the result is shown in Table 2.

Example 14

The coated particles obtained in Production Example 1, spherical barium titanate particles ($D_{50}$: 0.3 μm) that had a perovskite crystal structure and no coating layer, and a dispersant were mixed with cyclopentanone as a solvent using a disperser to obtain a slurry.

After formation of the slurry had been confirmed, a coating solution was prepared by kneading the slurry with a varnish consisting of the resin component of Formulation Example 1 shown in Table 1. The mass ratios of the coated particles, other particles, and the resin component in the coating solution were as shown in Table 2.

A copper-clad laminate sheet was obtained in the same manner as in Example 1, except for the above. The thickness of the resin composition layer of the copper-clad laminate sheet is shown in Table 2.

Example 15

The coated particles obtained in Production Example 1, spherical barium titanate particles ($D_{50}$: 0.2 μm) that had a perovskite crystal structure and no coating layer, and a dispersant were mixed with cyclopentanone as a solvent using a disperser to obtain a slurry.

After formation of the slurry had been confirmed, a coating solution was prepared by kneading the slurry with a varnish consisting of the resin component of Formulation Example 1 shown in Table 1. The mass ratios of the coated particles, other particles, and the resin component in the coating solution were as shown in Table 2.

A double-sided copper-clad laminate sheet was obtained in the same manner as in Example 1, except for the above.

The thickness of the resin composition layer of the copper-clad laminate sheet is shown in Table 2.

Comparative Example 3

Barium titanate particles ($D_{50}$: 0.1 μm) and a dispersant were mixed with cyclopentanone as a solvent using a disperser to obtain a slurry.

After formation of the slurry had been confirmed, a coating solution was prepared by kneading the slurry with a varnish consisting of the resin component of Formulation Example 1 shown in Table 1. The mass ratios of the barium titanate particles and the resin component contained in the coating solution were as shown in Table 2.

A double-sided copper-clad laminate sheet was obtained in the same manner as in Example 1, except for the above. The thickness of the resin composition layer of the obtained copper-clad laminate sheet is shown in Table 2.

Examples 16 to 21

The coated particles obtained in Production Example 1 and a dispersant were mixed with cyclopentanone as a solvent using a disperser to obtain a slurry.

After formation of the slurry had been confirmed, a coating solution was prepared by kneading the slurry with a varnish consisting of the resin component of any one of Formulation Examples 1 to 6 shown in Table 1. The mass ratios of the coated particles and the resin component in the coating solution were as shown in Table 3.

A double-sided copper-clad laminate sheet was obtained in the same manner as in Example 1, except for the above. The thickness of the resin composition layer of the copper-clad laminate sheet is shown in Table 3.

Evaluation 1

For each of the copper-clad laminate sheets obtained in Examples and Comparative Examples (specifically, the copper-clad laminate sheets obtained by using the particles produced in Production Examples 1 to 15 and the copper-clad laminate sheets obtained in Examples 14 and 15), the particle size $D_{50}$ of the particles contained in the resin composition layer was determined using a laser diffraction/scattering particle size distribution analyzer. The results are shown in Table 4 given below. The analysis was performed by using each of the slurries obtained in Examples and Comparative Examples.

Evaluation 2

From each of the copper-clad laminate sheets obtained in Examples and Comparative Examples, the copper foil was removed, and the proportion (percentage by mass) of the aluminum element in the particles contained in the resin composition layer was determined using ICP emission spectrometry. Also, XPS was performed on the resin composition layer using PHI Quantes available from ULVAC-PHI Inc. to determine the atomic ratio Al/(M+Al). The results are shown in Table 4. Details of the XPS and analysis were as follows.

Conditions

Excitation X ray: monochromatic Al-Kα ray (1486.7 eV)
Output: 50 W
Acceleration voltage: 15 kV
Diameter of X ray irradiation: 200 μmφ
X ray scanning area: 1000 μm ×300 μm
Detection angle: 45°
Pass energy: 26.0 eV
Energy step: 0.1 eV/step
Analyzed elements: C: 1 s, O: 1 s, Al: 2p, Ti: 2p, Ba: 3d 5/2

Analysis

XPS data analysis was performed using data analysis software (MultiPak Ver 9.9, available from ULVAC-PHI Inc.). Shirley was used as a background mode.

Evaluation 3

For each of the copper-clad laminate sheets obtained in Examples and Comparative Examples, fabricability was evaluated in the following manner.

Also, for each of the copper-clad laminate sheets obtained in Examples and Comparative Examples, the thickness of the resin composition layer, withstand voltage, leakage current, capacitance, and the peel strength between the copper foil and the resin composition layer (adhesion of circuit) were determined in the following manner. The results are shown in Tables 2 and 3.

Evaluation of Fabricability of Copper-Clad Laminate Sheet

The copper-clad laminate sheet was cut into a piece having a width of about 8 mm and a length of about 5 mm, and the cut piece was cut in the thickness direction using a fully motorized rotary microtome (RM 2265, available from Leica Biosystems) to expose a cross section. The exposed cross section was observed under an optical microscope (Leica DM LM, available from Leica Microsystems) to check whether or not an adhesion failure occurred at the bonding interface of the resin composition layers. The rating was given based on the following evaluation criteria. The results are shown in Tables 2 and 3.

Good: no adhesion failure was found at the bonding interface of the resin composition layers (no problem in fabricability).

Poor: an adhesion failure was found at the bonding interface of the resin composition layers (failure in fabrication occurred).

Thickness of Resin Composition Layer

An exposed cross section of the copper-clad laminate sheet was obtained in the same manner as in the evaluation of fabricability described above. The exposed cross section was observed under an optical microscope (Leica DM LM, available from Leica Microsystems), and the thickness of the resin composition layer was measured at randomly selected 5 points. The average of the found thicknesses was calculated. The results are shown in Tables 2 and 3.

Withstand Voltage

The copper-clad laminate sheet was etched on one side thereof to create a circular circuit with a diameter of 0.5 inches (12.6 mm), to thereby obtain a measurement sample. The breakdown voltage of the measurement sample was measured at a voltage increase rate of 167 V/sec using an insulation resistance meter (Super Megohm Meter SM 7110, available from Hioki E.E. Corporation). The measurement was performed in accordance with IPC-TM-650 2.5.6.2a.

The found value of the breakdown voltage was divided by the value of the thickness of the resin composition layer of the measurement target to obtain a withstand voltage per unit thickness. The results are shown in Tables 2 and 3.

Leakage Current

The copper-clad laminate sheet was etched on one side thereof to create a circular circuit with a diameter of 0.5 inches (12.6 mm), to thereby obtain a measurement sample. The leakage current of the measurement sample at an applied voltage of 50 V was measured using an insulation resistance meter (Super Megohm Meter SM 7110, available from Hioki E.E. Corporation). The measurement was performed in accordance with IPC-TM-650 2.5.6.2a. The results are shown in Tables 2 and 3.

Capacitance

The double-sided copper-clad laminate sheet was etched on one side thereof to create a circular circuit with a diameter of 0.5 inches (12.6 mm), to thereby obtain a measurement sample. The capacitance of the measurement sample at a frequency of 1 kHz was measured using an LCR meter (LCR HiTESTER 3532-50, available from Hioki E.E. Corporation). The measurement was performed in accordance with IPC-TM-650 2.5.2.

The found value of the capacitance was divided by the value of the thickness of the resin composition layer of the measurement target, and the capacitance per 3 µm thickness was calculated. The results are shown in Tables 2 and 3.

Peel Strength between Copper Foil and Resin Composition Layer (Adhesion of Circuit)

The copper-clad laminate sheet was etched on one side thereof to create a linear circuit with a width of 3 mm, to thereby obtain a measurement sample. The peel strength of the measurement sample was measured when peeling the circuit from the measurement sample at a peeling rate of 50 mm/min using an autograph. The measurement was performed in accordance with IPC-TM-650 2.4.8. When the found value was 0.3 kN/m or more, it was determined that the copper-clad laminate sheet was practically usable with no problems. The results are shown in Tables 2 and 3.

Evaluation 4

Figure 1A:
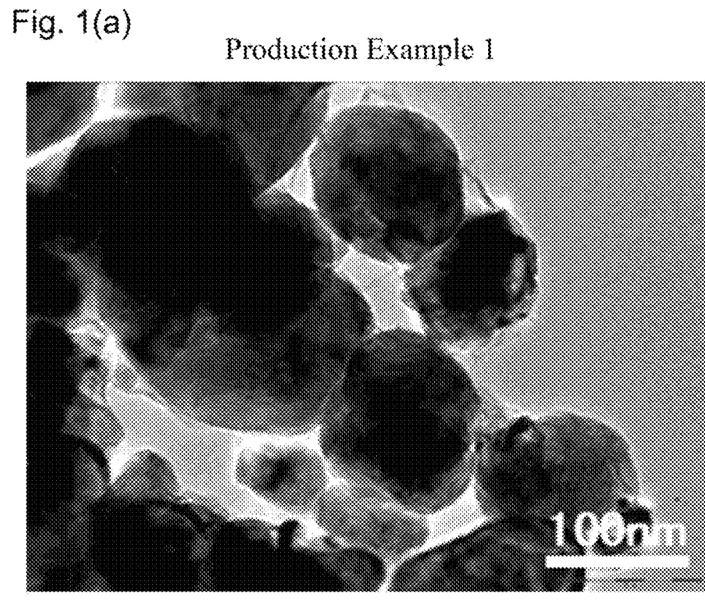
FIG. 1(a) is a transmission electron microscopy image of coated particles obtained in Production Example 1.
Figure 1B:
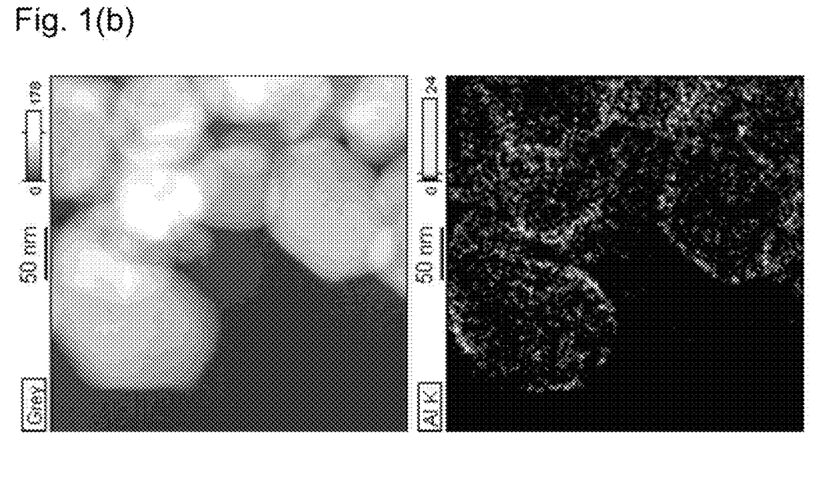
FIG. 1(b) shows, on the left side, a transmission electron microscopy image of the coated particles obtained in Production Example 1 after cross-section processing, and shows, on the right side, an elemental mapping image of the same field of view.

The coated particles obtained in each of Production Examples 1 and 10 were observed under a transmission electron microscope and also subjected to elemental mapping analysis. The results are shown in FIGS. 1 and 2.

Evaluation 5

Figure 3:
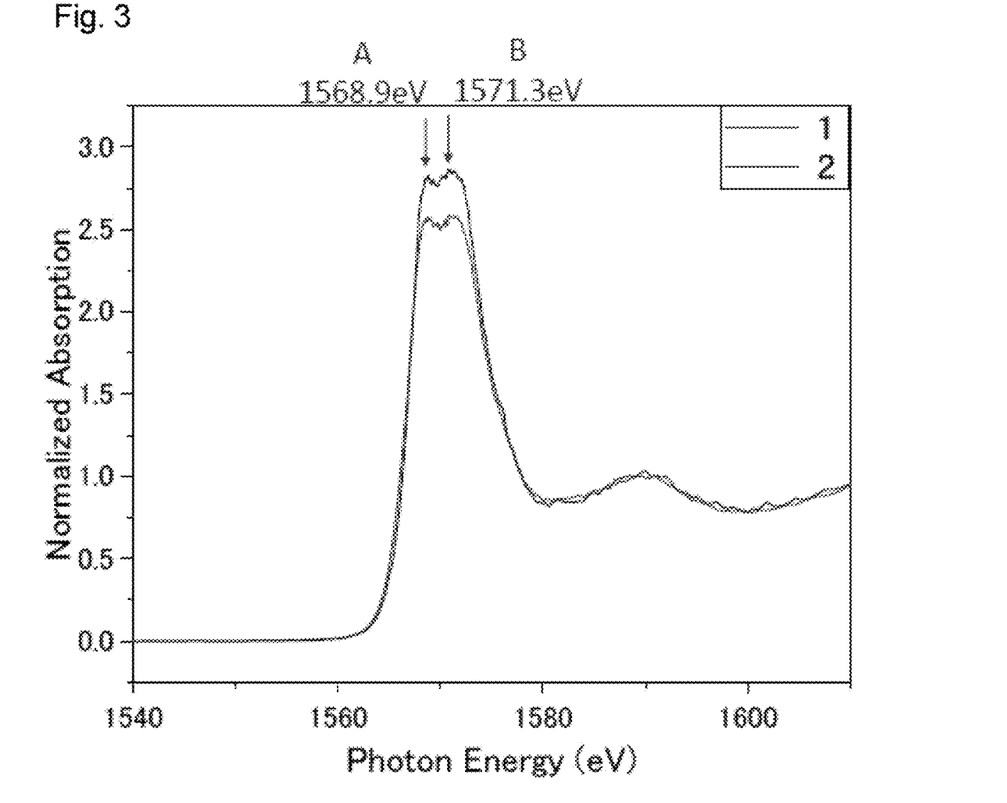
FIG. 3 shows results of XAFS (X-ray absorption fine structure) analysis on coated particles obtained in Production Examples 6 and 1.

XAFS analysis (X-ray absorption fine structure analysis) was performed on the coated particles obtained in each of Production Examples 6 and 1. The results are shown in FIG. 3. In FIG. 3, reference number 1 indicates a spectrum of the coated particles obtained in Production Example 6, and reference number 2 indicates a spectrum of the coated particles obtained in Production Example 1.

Detailed conditions are as follows.

Conditions

Measurement facility: Aichi Synchrotron Radiation Center

Beam line: BL1N2

Sample holding method: a sample was applied to an indium film

Measurement energy: 1500 to 2000 eV

Measurement time: 51 min.

Detection method: partial fluorescence yield method

Placement of detector and sample: X rays were incident at 22.5° from a direction vertical to the sample surface and detected at 90°

Background exclusion range: 1500 to 2000 eV

TABLE 1

| | Resin Component | | |
|---|---|---|---|
| | Component (1) | Component (2) | Component (3) |
| Formulation Example 1 | Epoxy | Diamine compound | Polyimide |
| Formulation Example 2 | Epoxy | Active ester | Polyimide |
| Formulation Example 3 | Epoxy | Phenol | Polyimide |
| Formulation Example 4 | Epoxy | Diamine compound | Aromatic polyamide |
| Formulation Example 5 | Epoxy | Active ester | Aromatic polyamide |
| Formulation Example 6 | Epoxy | Phenol | Aromatic polyamide |

TABLE 2

| | Resin composition | | | | | | | Characteristics evaluation | | | | |
|---|---|---|---|---|---|---|---|---|---|---|---|---|
| | Coated particles | | Other particles | | Resin component | | | Thickness of resin composition layer (µm) | Withstand voltage (V/µm) | Leakage current at 50 V (µA/cm$^2$) | Capacitance per 3 µm thickness (nF/in$^2$) | Peel strength (Adhesion of circuit) (kN/m) |
| | Type | Amount (parts) | Type | Amount (parts) | Type | Amount (parts) | Fabricability | | | | | |
| Example 1 | Production Example 1 | 79 | Barium sulfate | 2 | Formulation Example 1 | 19 | Good | 3.2 | 75 | 0.2 | 38 | 0.4 |
| Example 2 | Production Example 2 | 81 | — | — | Formulation Example 1 | 19 | Good | 3.0 | 77 | 0.2 | 36 | 0.5 |
| Example 3 | Production Example 3 | 81 | — | — | Formulation Example 1 | 19 | Good | 3.0 | 8 | 0.5 | 38 | 0.5 |
| Example 4 | Production Example 4 | 81 | — | — | Formulation Example 1 | 19 | Good | 3.2 | 72 | 0.3 | 37 | 0.4 |
| Example 5 | Production Example 5 | 81 | — | — | Formulation Example 1 | 19 | Good | 2.8 | 100 | 1.0 | 39 | 0.5 |
| Example 6 | Production Example 6 | 81 | — | — | Formulation Example 1 | 19 | Good | 3.3 | 70 | 0 | 30 | 0.3 |
| Example 7 | Production Example 7 | 81 | — | — | Formulation Example 1 | 19 | Good | 3.0 | 103 | 0 | 41 | 0.5 |
| Example 8 | Production Example 8 | 81 | — | — | Formulation Example 1 | 19 | Good | 2.5 | 116 | 5.0 | 38 | 0.4 |
| Example 9 | Production Example 9 | 81 | — | — | Formulation Example 1 | 19 | Good | 3.3 | 88 | 0 | 35 | 0.5 |
| Example 10 | Production Example 12 | 79 | — | — | Formulation Example 1 | 21 | Good | 3.1 | 90 | 1.8 | 36 | 0.7 |
| Example 11 | Production Example 13 | 79 | — | — | Formulation Example 1 | 21 | Good | 3.2 | 97 | 1.3 | 36 | 0.7 |
| Example 12 | Production Example 14 | 79 | — | — | Formulation Example 1 | 21 | Good | 3.3 | 33 | 6.5 | 36 | 0.7 |

TABLE 2-continued

| | Resin composition | | | | | | Characteristics evaluation | | | | |
|---|---|---|---|---|---|---|---|---|---|---|---|
| | Coated particles | | Other particles | | Resin component | | | Thickness of resin composition layer (μm) | Withstand voltage (V/μm) | Leakage current at 50 V (μA/cm²) | Capacitance per 3 μm thickness (nF/in²) | Peel strength (Adhesion of circuit) (kN/m) |
| | Type | Amount (parts) | Type | Amount (parts) | Type | Amount (parts) | Fabric-ability | | | | | |
| Example 13 | Production Example 15 | 79 | — | — | Formulation Example 1 | 21 | Good | 3.2 | 25 | 20.0 | 37 | 0.7 |
| Example 14 | Production Example 1 | 64.4 | Barium titanate / Barium sulfate | 5 / 1.6 | Formulation Example 1 | 19 | Good | 2.9 | 69 | 39.8 | 37 | 0.6 |
| Example 15 | Production Example 1 | 64.4 | Barium titanate / Barium sulfate | 15 / 1.6 | Formulation Example 1 | 19 | Good | 2.8 | 75 | 26.8 | 36 | 0.5 |
| Comp. Ex. 1 | Production Example 10 | 81 | — | — | Formulation Example 1 | 19 | Poor | 2.9 | 97 | 12.5 | 37 | 0.1 |
| Comp. Ex. 2 | Production Example 11 | 81 | — | — | Formulation Example 1 | 19 | Poor | 3.3 | 76 | 1.3 | 21 | 0.1 |
| Comp. Ex. 3 | — | — | Barium titanate | 81 | Formulation Example 1 | 19 | Good | 2.6 | 27 | 175 | 42 | 0.3 |

TABLE 3

| | Resin composition | | | | | | Characteristics evaluation | | | | |
|---|---|---|---|---|---|---|---|---|---|---|---|
| | Coated particles | | Other particles | | Resin component | | | Thickness of resin composition layer (μm) | Withstand voltage (V/μm) | Leakage current at 50 V (μA/cm²) | Capacitance per 3 μm thickness (nF/in²) | Peel strength (Adhesion of circuit) (kN/m) strength |
| | Type | Amount (parts) | Type | Amount (parts) | Type | Amount (parts) | Fabric-ability | | | | | |
| Example 16 | Production Example 1 | 77 | Barium sulfate | 2 | Formulation Example 1 | 21 | Good | 2.8 | 111 | 1.6 | 38 | 0.5 |
| Example 17 | Production Example 1 | 77 | Barium sulfate | 2 | Formulation Example 2 | 21 | Good | 2.6 | 96 | 1.9 | 36 | 0.3 |
| Example 18 | Production Example 1 | 77 | Barium sulfate | 2 | Formulation Example 3 | 21 | Good | 2.7 | 104 | 10.3 | 45 | 0.3 |
| Example 19 | Production Example 1 | 77 | Barium sulfate | 2 | Formulation Example 4 | 21 | Good | 3.0 | 67 | 0.6 | 50 | 0.6 |
| Example 20 | Production Example 1 | 77 | Barium sulfate | 2 | Formulation Example 5 | 21 | Good | 2.7 | 115 | 17.3 | 47 | 0.4 |
| Example 21 | Production Example 1 | 77 | Barium sulfate | 2 | Formulation Example 6 | 21 | Good | 2.9 | 90 | 6.3 | 48 | 0.4 |

TABLE 4

| | Particle size $D_{50}$ (μm) | Atomic ratio Al/(M + Al) | Amount of Al (%) |
|---|---|---|---|
| Production Example 1 | 0.13 | 0.32 | 1.04 |
| Production Example 2 | 0.15 | 0.36 | 1.00 |
| Production Example 3 | 0.16 | 0.35 | 1.01 |
| Production Example 4 | 0.19 | 0.28 | 0.80 |
| Production Example 5 | 0.13 | 0.23 | 0.66 |
| Production Example 6 | 0.21 | 0.62 | 2.28 |
| Production Example 7 | 0.16 | 0.36 | 1.00 |
| Production Example 8 | 0.20 | 0.37 | 1.01 |
| Production Example 9 | 0.15 | 0.11 | 0.98 |
| Production Example 10 | 0.29 | 0.47 | 3.82 |
| Production Example 11 | 0.36 | 0.80 | 3.79 |
| Production Example 12 | 0.29 | 0.48 | 1.04 |
| Production Example 13 | 0.31 | 0.41 | 0.85 |
| Production Example 14 | 0.30 | 0.30 | 0.51 |
| Production Example 15 | 0.28 | 0.16 | 0.25 |
| Example 10 | 0.18 | 0.30 | 0.91 |
| Example 11 | 0.16 | 0.26 | 0.92 |

As is clear from the results shown in Tables 2 and 3, the copper-clad laminate sheets obtained in Examples exhibit a high withstand voltage, a small leakage current, and a high capacitance, and also have an excellent adhesion between the copper foil and the resin composition layer.

Also, from the results shown in FIG. 1, it is confirmed that in the coated particles obtained in Production Example 1, a film-like portion was formed on the surfaces of the cores made of barium titanate. Also, from the results of H-NMR, Al-NMR, AES, XPS, and radiation XRD, it can be confirmed that the film-like portion contained an aluminum hydrous oxide.

On the other hand, from the results shown in FIG. 2, it is confirmed that in the coated particles obtained in Production Example 10, aggregated particles were attached to the surfaces of the cores made of barium titanate. The reason for this is probably that the pH of the dispersion when sodium aluminate was added thereto was not sufficiently high, and that the heating temperature of the dispersion was high. It was also confirmed by analysis in the same manner as for the film-like portion that the aggregated particles contained an aluminum hydrous oxide.

Although not shown in Figures, the inventors of the present application also confirmed that, for the coated particles obtained in each of Production Examples 2 to 9 and Production Examples 12 to 15, a film-like portion containing an aluminum hydrous oxide was formed on the surfaces of the cores made of barium titanate.

Also, as is clear from the results shown in FIG. 3, two peaks (specifically, peak A and peak B) were exhibited between 1567eV and 1577eV in the XAFS spectrum of the coated particles obtained in each of Production Examples 6 and 1. When the spectrum was compared with, for example, a reference for aluminum compounds disclosed in J. Synchrotron Rad. (1999) 6. 621-623, it was found that the spectrum was similar to the spectrum of the six-coordination structure, and it is therefore supposed that the aluminum compound in the film-like portion had a six-coordination structure.

INDUSTRIAL APPLICABILITY

According to the present invention, a resin composition that is preferably used as a dielectric layer of a capacitor element is provided. A capacitor element containing the resin composition as a dielectric layer exhibits a low leakage current. Also, the resin composition has high bondability, and thus can be well bonded to metal foil or the like as an electrode.

The invention claimed is:

1. A resin composition comprising:
   coated particles, each comprising a core containing a metal oxide and a coating layer containing an aluminum hydrous oxide and provided on a surface of the core; and
   a resin,
   wherein the metal oxide is represented by MxOy, where M represents at least one element selected from the group consisting of Ba, Ti, Sr, Pb, Zr, La, Ta, Ca, and Bi, and x and y each represent a number determined from a stoichiometric ratio according to the valence of the metal element M,
   the resin composition has an atomic ratio Al/(M+Al) of 0.05 or more and 0.7 or less, as determined by XPS for the particles contained in the resin composition, and
   a proportion of an aluminum element is 0.2 mass % or more and 3.0 mass % or less, based on the mass of all particles contained in the resin composition.

2. The resin composition according to claim 1, wherein the coated particles have a 50th percentile particle size $D_{50}$ of 0.01 μm or more and 3.0 μm or less in a volume-weighted particle size distribution as determined by a laser diffraction/scattering method.

3. The resin composition according to claim 1, wherein the element M at least contains Ti and at least one of Ba and Sr.

4. The resin composition according to claim 1, wherein the metal oxide is a compound having a perovskite crystal structure.

5. The resin composition according to claim 1, further comprising particles made of the metal oxide but without the coating layer.

6. The resin composition according to claim 1, wherein the coated particles are contained in an amount of 30 parts by mass or more and 90 parts by mass or less, per 100 parts by mass of the solid content of the resin composition.

7. The resin composition according to claim 1, wherein the resin comprises at least one selected from the group consisting of an epoxy resin, a polyphenylene ether resin, an aromatic polyamide resin, a polyamide imide resin, a polyimide resin, an active ester resin, a phenol resin, and a diamine compound.

8. The resin composition according to claim 1, further comprising barium sulfate particles.

9. The resin composition according to claim 1, wherein the resin composition is in the form of a film with a thickness of 15 μm or less.

10. A resin-coated metal foil comprising:
    a metal foil; and
    a layer made of the resin composition according to claim 1 and provided on at least one side of the metal foil.

11. The resin-coated metal foil according to claim 10, wherein the metal foil is a copper foil.

12. A metal-clad laminate sheet comprising:
    a first metal foil;
    a second metal foil; and
    a resin composition layer interposed between the two metal foils,
    wherein the resin composition layer is a cured product of the resin composition according to claim 1.

13. The metal-clad laminate sheet according to claim 12, wherein the metal-clad laminate sheet exhibits a withstand voltage per unit thickness of the resin composition layer of 50 V/μm or more, as measured by applying a DC voltage between the two metal foils.

14. The metal-clad laminate sheet according to claim 12, wherein the metal-clad laminate sheet exhibits a leakage current value of 150 uA/cm² or less, as measured by applying a DC voltage of 50 V between the two metal foils.

15. The metal-clad laminate sheet according to claim 12, wherein the metal-clad laminate sheet has a peel strength of 0.3 kN/m or more between the metal foil and the resin composition layer.

16. A capacitor element comprising the metal-clad laminate sheet according to claim 12.

* * * * *